July 24, 1951
F. B. RECKER
2,561,755
TWO-WAY SPEED REDUCING UNIT
Filed May 20, 1947
4 Sheets-Sheet 2
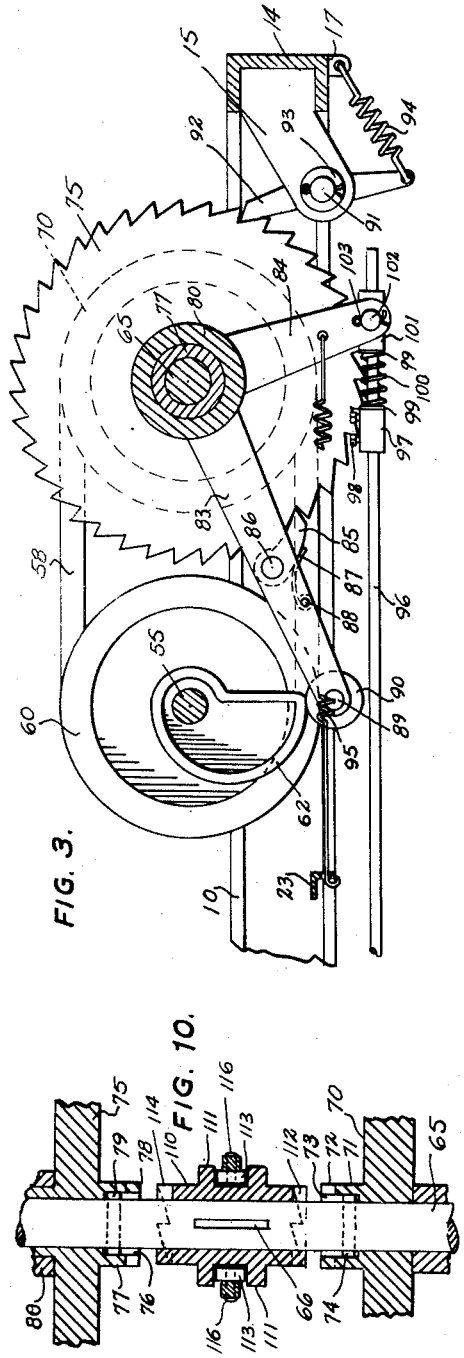
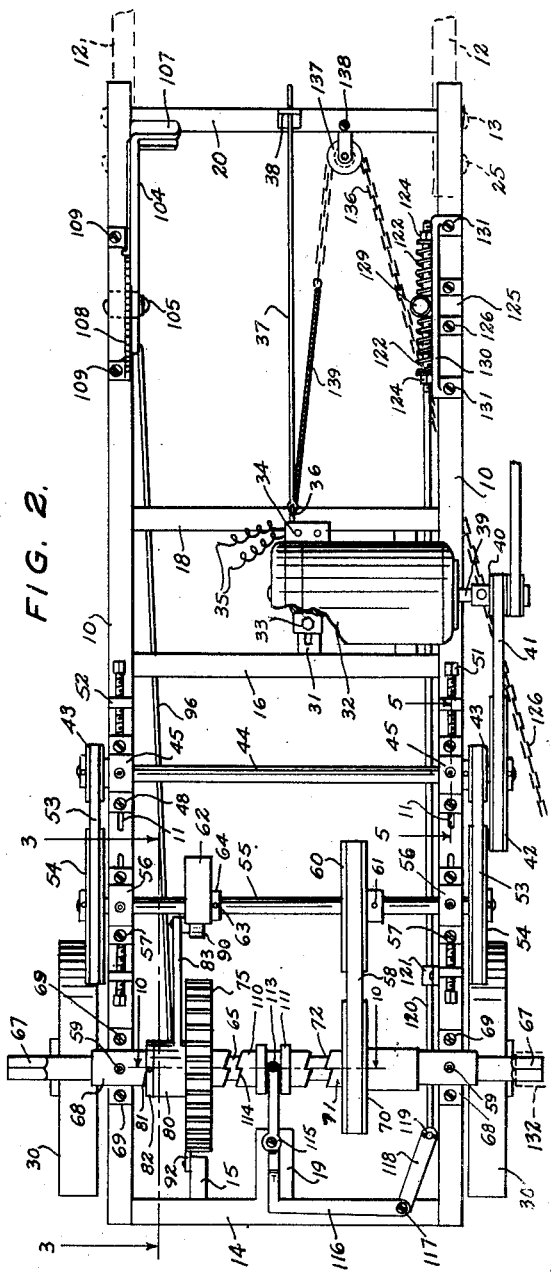
Inventor
FLORIAN B. RECKER,
By McMorrow, Berman & Davidson
Attorneys July 24, 1951    F. B. RECKER    2,561,755
TWO-WAY SPEED REDUCING UNIT
Filed May 20, 1947    4 Sheets-Sheet 3

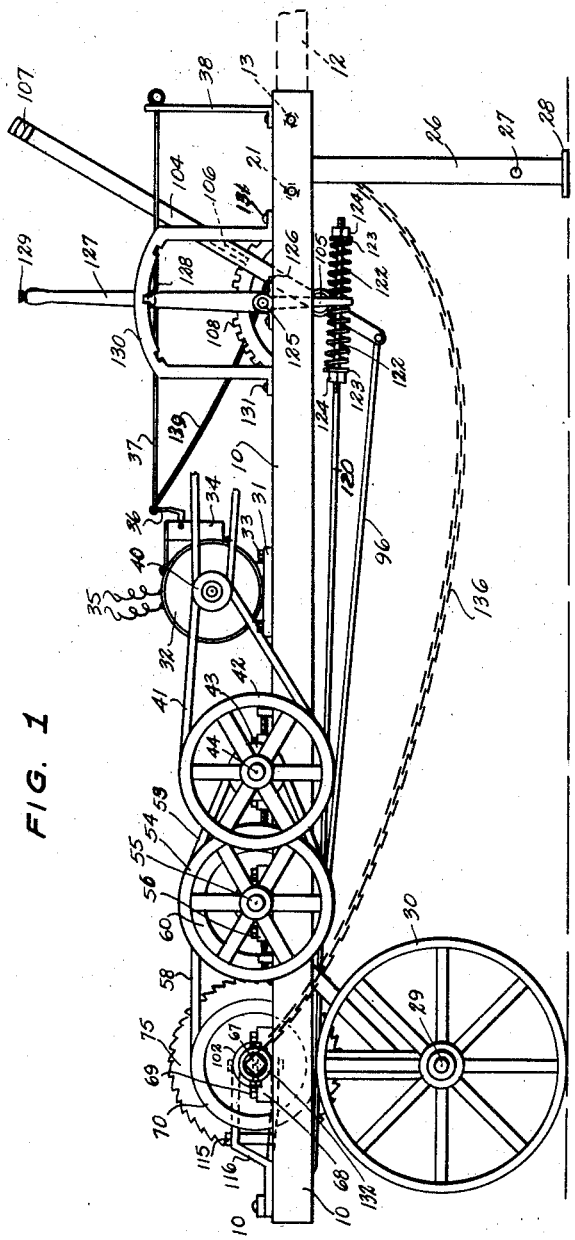

FLORIAN B. RECKER, Inventor

July 24, 1951      F. B. RECKER      2,561,755
TWO-WAY SPEED REDUCING UNIT
Filed May 20, 1947      4 Sheets-Sheet 4
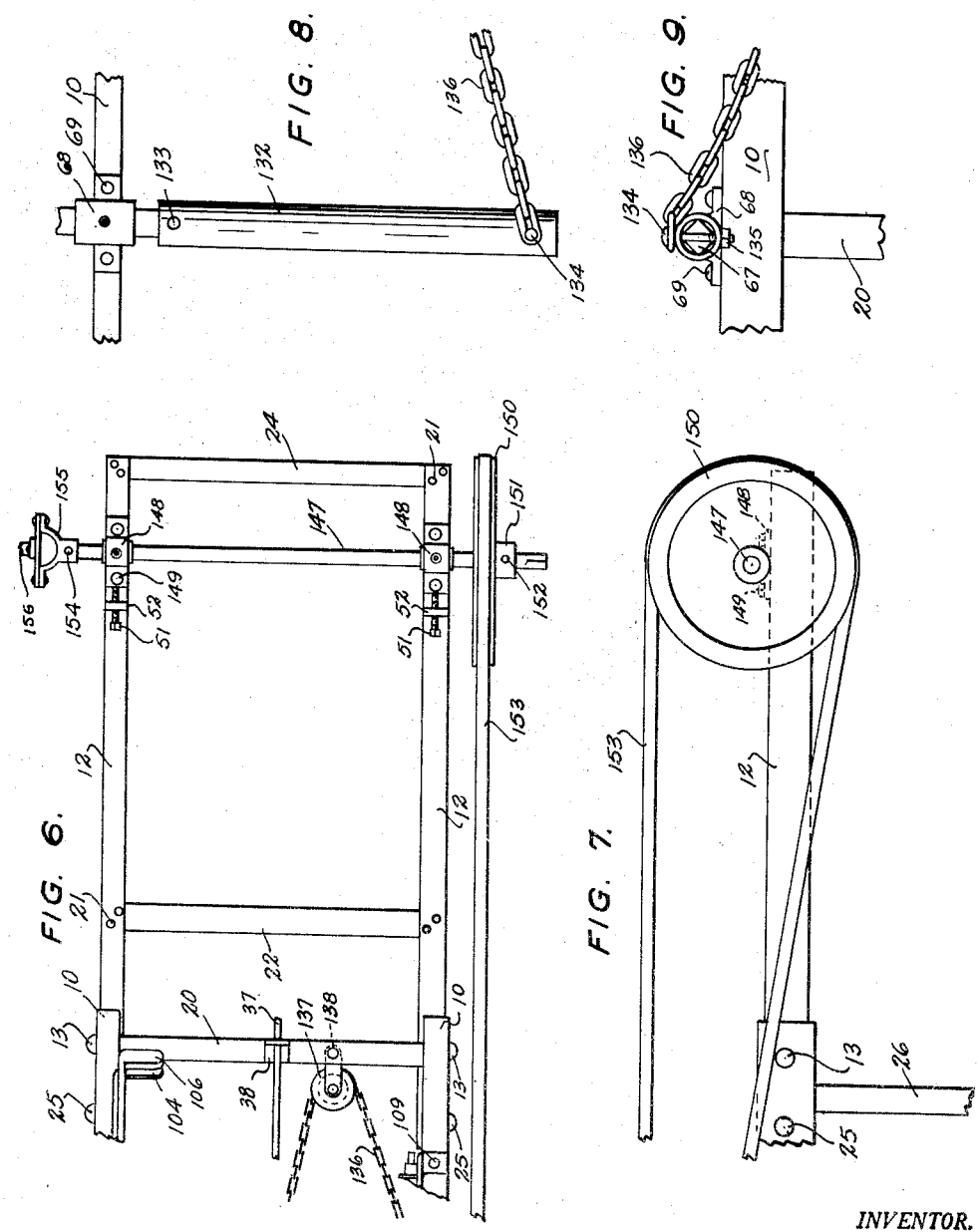
INVENTOR.
FLORIAN B. RECKER,
BY
*McMorrow, Berman Davidson*
ATTORNEYS.

Patented July 24, 1951

2,561,755

UNITED STATES PATENT OFFICE 2,561,755

TWO-WAY SPEED REDUCING UNIT

Florian B. Recker, Hopkinton, Iowa

Application May 20, 1947, Serial No. 749,154

2 Claims. (Cl. 318—470)

This invention relates to a two-way, speed-reducing unit for operating an unloader drive on farm wagons.

In my copending application entitled "Vehicle Body," Serial No. 707,105, filed November 1, 1946, now Patent No. 2,463,643, there is illustrated and described a farm wagon having a movable end wall for unloading the wagon without the usual pitching or shoveling operation.

The present invention provides a power drive for a wagon having such a movable end wall and unloader drive therefor; the present invention includes in addition a second power take-off for operating a feeding device for handling the material unloaded from the wagon.

The object of the present invention is to provide a speed-reducing unit comprising a three-stage reduction drive between the driving motor and the movable end wall of the farm wagon.

It is another object of the present invention to provide a speed-reduction unit in which the terminal rotary member for operating the movable end wall of a wagon has low but uniform angular velocity and at a high torque.

It is an additional object of the present invention to provide a speed-reduction unit for operating the movable end wall which includes a reverse drive for returning the movable end wall at relatively high speed.

It is a further object of the present invention to provide a speed-reduction unit for operating the movable end wall in a farm wagon which has a power take-off for operating a conveyor to remove the contents of the wagon as same are unloaded.

Still other objects, advantages and improvements will become apparent from the following specification, taken in connection with the accompanying drawings, in which:

Figure 1 is a side elevational view of the two-way, speed-reduction drive of the present invention;

Figure 2 is a top plan view of the two-way, speed-reduction device;

Figure 3 is a view on the section line 3—3 of Figure 2, showing the step-by-step mechanism; this being the final stage of the speed-reduction device;

Figure 6 is a view showing an extension on the main frame of the speed-reduction drive for mounting an auxiliary drive shaft which operates the conveyor for removing the material unloaded from the wagon;

Figure 7 is a side elevational view of the frame extension and the auxiliary drive shaft shown in Figure 6;

Figure 8 is a top plan view of the principal operating parts of the stop mechanism for the driving motor used in connection with the speed-reduction device of the present invention;

Figure 9 is a side elevational view of the stop mechanism shown in Figure 8;

Figure 10 is a sectional view on the section line 10—10 of Figure 2, showing in detail the clutch for controlling the direction of the drive.

Figure 4:
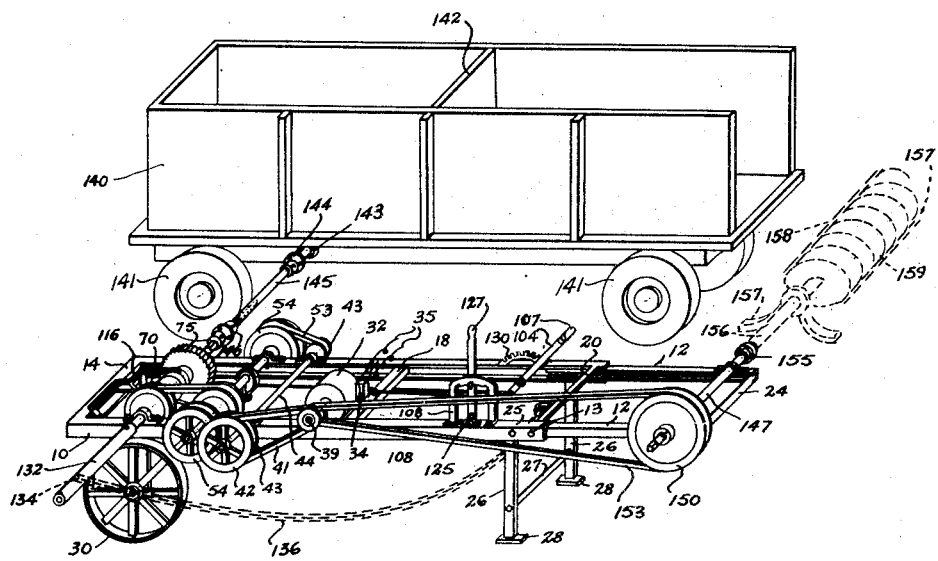
Figure 4 is a perspective view of the speed-reduction unit of the present invention, showing same attached to the unloader shaft of a farm wagon having a movable end wall.

Referring now to the drawings in detail, and to Figures 1 and 2 in particular, the speed-reduction device of the present invention is here shown as being mounted on a frame comprised of longitudinal members 10—10, which are cross connected by transverse members 14, 16, 18 and 20. These cross-members may be connected to the side members 10—10 by any suitable means, as by welding or bolts or rivets, as shown at 13 (Figure 1), between the cross-member 20 and the side frame member 10. The frame is supported at its front and rear ends by legs 26—26, these being secured to the side frame members 10 by bolts or rivets 21, and the rear legs having feet 28—28. The legs 26—26 are cross-connected by a brace 27. At the front end the brace 27 is replaced by an axle 29 on which wheels 30—30 are mounted.

An electric motor 32 is adjustably secured between the middle cross-members 16 and 18. Longitudinal supports 31—31 are secured to the cross-members, as by welding, and bolts 33 pass through the feet of the motor and suitable slots in the supports. A switch box 34 is mounted on the electric motor 32, and wires 35—35 extend from a suitable source of electrical energy (not shown) to this switch box. Within the switch box 34 there is mounted a switch (not shown) and an operating arm 36 is provided within the switch box and extends exteriorly thereof. An extension rod 37 is connected to the operating arm 36 and extends freely through an angle bracket 38 mounted on the forward cross-member 20.

Figure 5:
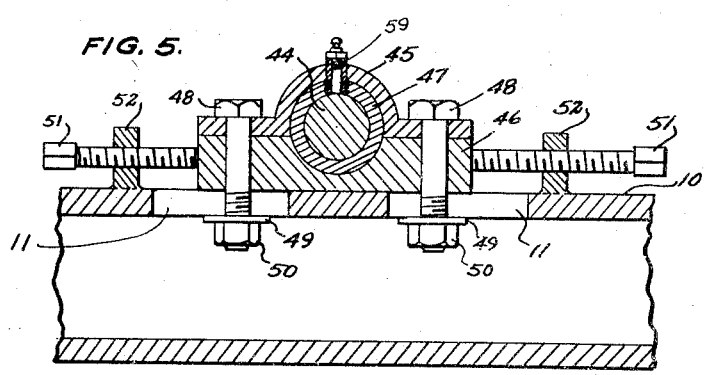
Figure 5 is a view on the section line 5—5 of Figure 2, showing the adjustable mounting of a pillow block bearing for the first and second stages of the speed-reduction drive.

The electric motor 32 has a shaft 39 on which is mounted a double V pulley 40. From the pulley 40 a belt 41 extends to a V pulley 42 mounted on a cross-shaft 44. The adjustable mounting of the electric motor on the supports 31—31 enables the belt 41 to be loosened or tightened, as the case may be. The pulley 42 is of larger diameter than the pulley 40, and the ratio of the two provides the first stage of speed reduction. V pulleys 43—43 are mounted on the cross-shaft 44, one intermediate the V pulley 42, and the side frame member 10 and the other on the opposite end of the shaft and adjacent the opposite side frame member 10. The cross-shaft 44 is mounted on the side frame members 10—10 by pillow block bearings 45—45. As shown in Figure 5, each of these bearings comprises a cover plate 45, a base 46, and a journal bushing 47, positioned between the two. A screw-threaded grease fitting 59 of well kown construction passes through the cover plate 45 and journal bushing 47, securing the latter against rotation with respect to the former, as well as providing for lubrication of the journal bushing and shaft 44.

Bolts 48 with washers 49 and nuts 50 on their lower ends extend through the cover plate 45, base 46 and through elongated slots 11 in the side frame members 10—10, this attachment means providing for adjustably positioning the pillow block bearings along the side frame members to shift the pillow block bearings 45—45 along the side frame members 10—10, there are provided screws 51—51 abutting these bearings and mounted in lugs on ears 52 secured to the frame members 10—10 in any suitable manner, as by welding.

From the pulleys 43—43, belts 53—53 run over pulleys 54—54 mounted on a second cross-shaft 55. Again the pulleys 54—54 are of larger diameter than the pulleys 43—43, and the ratio of the two provides the second stage of speed reduction. The cross-shaft 55 is journaled on the frame members 10—10 by pillow block bearings 56—56, these being adjustably secured to the frame by bolts 57 extending through slots 11 in the frame members in the same manner as the pillow block bearings 45 in the preceding stage. Again there are provided screws 51—51 abutting these bearings and mounted in lugs or ears 52 on the side frame members 10—10.

A driven shaft 65 is journaled on the frame members 10—10 by pillow block bearings 68—68, secured to the frame members by bolts 69. Either end of this shaft may be the power take-off, and both ends are formed as square sections 67 for this purpose. On the shaft 65 there is freely mounted a pulley 70 having an integral hub 71. The hub 71 on its outer face abuts the adjacent pillow block bearing 68, and on its inner face is formed with axially extending clutch jaws 72. A groove or counterbore 73 is formed in the hub 71 below the clutch jaws 72, and this groove receives a pin 74 mounted in the shaft 65 to limit any inward travel of the pulley 70. A V belt 58 runs over the pulley 70 and also over a pulley 60 mounted on the cross-shaft 55 by a pin 61, the pulleys 70 and 60 being of the same diameter.

A ratchet gear 75 is also freely mounted on the shaft 65, and this gear likewise has an integral hub 77. The hub 77 on its outer face abuts the adjacent pillow block bearing 68, and on its inner face is formed with axially extending clutch jaws 78, these being inclined in the opposite direction to the clutch jaws 72 on the hub 71 of the pulley 70. Likewise, a groove or counterbore 76 is formed in the inner face of the hub 77 under the clutch jaws 78, and this groove receives a pin 79 mounted in the shaft 65 to limit any inward movement of the ratchet gear.

A sleeve 80 is oscillatably mounted on the hub 77 adjacent the outer face of the ratchet gear 75 and is held in position by a collar 82 through which a set screw 81 extends. The sleeve 80 is formed with two integral arms 83 and 84, as shown, these being approximately 90° apart. The arm 83 is the operating arm and has pivotally mounted thereon at 86 a pawl 85, which is biased by a spring 87 into engagement with the teeth of the ratchet gear 75, the spring 87 being coiled at its outer end around a pin 88. At its free end the arm 83 carries a follower roller 90 pivotally mounted thereon at 89. In order to prevent reverse rotation of the ratchet gear 75, a detent 92 is pivoted by a pin 91 on a suitable arm or leg 15 on the frame member 14, the pin being held in place by a cotter key 93. The detent 92 is biased into engagement with the ratchet gear 75 by a tension spring 94 which is connected between the outer arm of the detent and a suitable ear 17 on the frame member 14.

A cam 62 is mounted on the cross-shaft 55, this cam having an integral hub 64 through which a pin 63 extends. The cam 62 drives the follower roller 90. The follower roller 90 is held in engagement with the cam 62 by a coiled tension spring 95 which is hooked at one end in a hole in the operating arm 84 and at the other end in an angle bracket 23 which is secured to the longitudinal side frame members 10 in any suitable manner, as by welding.

The arm 84 on the sleeve 80 is the adjusting arm for determining the throw of a follower roller 90 with respect to the lift of the cam 62. An operating rod 96 is connected to the arm 84 by a lost motion or shock-absorbing connection which comprises a sleeve 101 freely mounted on the operating rod and a second sleeve 97, spaced inwardly of the sleeve 101, with a coil compression spring 100 interposed between the sleeves, washers 99 being positioned between the ends of the spring and the sleeves. The sleeve 97 is secured to the operating rod 96 by radially positioned set screws 98 and the sleeve 101 has a pivot pin 102 force fitted in its side wall which pin extends through a hole in the arm 84 and is secured therein by a cotter key 103. The operating rod 96 extends to an adjusting lever 104 which is pivoted at 105 on one of the side frame members 10. The lever 104 carries the usual spring-pressed detent 106 and the operating handle 107 therefor, which detent cooperates with a sector rack 108 secured to the side frame member 10 by bolts 109.

A clutch collar 110 is slidably mounted on the cross-shaft 65 intermediate the pulley 70 and the ratchet gear 75, this collar having an internal groove in its hub which rides over a spline 66 which may be a half-moon key positioned longitudinally in the shaft and secured therein by a force fit or by welding. The collar 110 has axially extending clutch jaws 112 at one end for mating engagement with the clutch jaws 72 on the pulley 70, and oppositely directed axially extending clutch jaws 114 on the other end for mating engagement with the clutch jaws 78 on the ratchet gear 75. Integral parallel flanges 111—111 are formed on the clutch collar 110 adjacent its midsection.

A bell crank lever 116 is pivoted at 115 on an inwardly extending arm 19 on the cross frame member 14, and this lever is bifurcated at its outer end (Figure 10), and on the parallel sides there are mounted pivoted rollers 113—113 positioned intermediate the flanges 111—111 on the clutch sleeve 110. A connecting link 118 is pivoted at one end at 117 to the bell crank lever 116, and at the other end at 119 to an operating rod 120. The operating rod 120 is guided in eye straps 121 secured to one of the side frame members 10 and is connected at its opposite end to the lower end of an operating lever 127 by a double lost motion connection. The rod 120 extends freely through a suitable hole in the lower end of the lever 127, and springs 122—122 surround this rod on either side of the lower end of the lever. Nuts 124—124 are mounted on the rod 120 and abutted by the outer ends of the springs 122, washers 123 being interposed between the ends of the springs and the nuts. The operating lever 127 is preferably mounted on one of the side frame members 10 by a pivot block 125, which in turn is secured to the side frame member by bolts 126. This lever carries the usual spring-pressed detent 128 and operating button 129 therefor. The detent 128 cooperates with the sector rack 130 formed as an inverted U member and secured to the side frame member by bolts 131.

An automatic stopping device is connected between the driven shaft 65 and the switch box 34 of the electric motor 32. This device, in its preferred form, consists of a tubular member 132 having a squared section at one end of its bore which fits over the squared section 67 on one end of the shaft 65; a pin 133 may be mounted through the tubular member 132 and the shaft 65, if desired. A chain 136 is connected to the outer end of the tubular member 132 by bolt 134 extending through diametrically positioned holes in the latter and having a nut 135 mounted on its end. The chain 136 extends around a pulley 137 which is secured to the outer cross frame member 20 by a bolt or pin 138, and thence to an elongated tension spring 139 which is connected to the arm 36 extending from the motor switch box 34.

As previously stated, the two-way, speed-reducing unit of the present invention may be used for unloading wagons of the type shown in my copending application No. 707,105. Such a wagon is shown in Figure 4, and comprises a body 140 mounted on wheels 141 and having a movable end wall 142 driven from an operating or unloader shaft 143. The operating shaft 143 drives the movable end wall 142 rearwardly to unload the body 140 by a mechanism which is not here shown, but which is fully disclosed and illustrated in said copending application. The wagon 140 is shown with the tail gate removed and in a partially unloaded condition. The driven shaft 65 of the speed-reduction unit of the present invention is connected to the operating shaft 143 of the wagon by a connecting shaft 145 having flanged couplings 144 and 146 on either end. The flanged coupling 146 has an internal square section on its outer end for fitting over the square section 67 on the driven shaft 65, and the flanged coupling 144 is similarly arranged for connection to the operating shaft 143. As the wagons 140 will not always be stopped at the same distance from the unloader mechanism, the connecting shaft 145 is made of telescopic construction.

In unloading various materials, it may be desirable to convey same to a central place for packing or storage. For instance, if the wagon 140 should contain grain, it would be desirable to have a conveyor to carry the grain from the end of the wagon 140 to the point where same is sacked. For the ordinary use of the two-way, speed-reduction unit, where it drives only the unloader shaft 143 for the wagon 140, the frame is made no longer than necessary for obvious reasons of economy of material, and in such case it would be shorter than the wagon body 140. In order to use a conveyor at the end of the wagon, an extension of the frame is provided. This extension is comprised of auxiliary longitudinal frame members 12—12 secured to the main longitudinal frame member 10—10 by bolts 13, and cross-members 22 and 24 secured to the auxiliary longitudinal frame members 12—12 by bolts or rivets 25. A cross-shaft 147 is mounted on the auxiliary longitudinal frame members 12—12 by pillow block bearings 148, these being secured to the frame member by bolts 149. At its outer end the cross-shaft 147 mounts a V pulley 150 having a hub 151 through which a set screw 152 extends to secure the pulley to the shaft. A belt 153 runs over the pulley 150, and over one section of the double V pulley 40 on the shaft 39 of the electric driving motor 32. At its opposite end the cross-shaft 147 has attached thereto a universal coupling 155 by a pin 154. The universal coupling 155 connects the cross-shaft 147 to a shaft 156 of a conveyor. This conveyor is mounted on standards 157—157 and comprises a cylindrical housing 158 open at its top, a spiral element 159 being mounted within the housing 158 and on the shaft 156.

In operation, the speed-reduction unit of the present invention has its driven shaft 65 connected to the unloader shaft 143 of the wagon by the intermediate shaft 145. The electric motor 32 drives the shaft 65 through the three-stage, speed-reduction drive comprised of the pulleys 40—42 and 43—54, and the step-by-step mechanism comprised of the cam 62, follower roller 90, arm 83, ratchet gear 75. While so driving the unloader shaft 143, the clutch sleeve 110 has its jaws 114 in engagement with the cooperating jaws 78 on the ratchet gear 75. Rotation of the unloader shaft 143 drives the movable end wall 142 rearwardly to force the contents of the wagon body 140 out the open rear end. The first two stages of the speed-reduction drive are fixed by the ratios of the pulleys 40 and 42 and 43 and 54, but the third stage may be varied by setting the throw of a follower roller 90 with respect to the lift of the cam 62, this adjustment being made by setting the adjusting lever 104. As previously stated, the tension spring 95, operating on the adjusting arm 84, continuously maintains the follower roller 90 in operating engagement with the cam 62. Usually, the shafts 65—143 will rotate at about 2 to 4 revolutions per minute, and will make about 12 or 14 revolutions while the movable end wall 142 travels the entire length of the wagon body 140. As the driven shaft 65 rotates, the chain 136 will be wound up thereon, the turns being formed on the tubular member inwardly towards the adjacent side frame member 10. The length of this chain is so selected that, as the movable end wall 142 reaches the open tail gate of the wagon, the chain will be entirely wound up on the tubular member and will operate the switch 34 and stop the electric motor 32.

When the wagon 140 has been unloaded, the clutch sleeve 110 is shifted along the shaft 65 so that the jaws 112 thereof engage the jaws 72 on the pulley 70. There is then a direct drive from the cross-shaft 55 to the shaft 65 through the pulleys 60—70 and the shafts 65 and 143 then rotate in a reverse direction and at a greatly increased speed to return the movable end wall 142 to the forward end of the wagon.

The two-way, speed-reduction unit of the present invention may be used to unload wagons containing chopped hay, chopped straw, grain, silage, and ear corn. The material unloaded from the rear end of the wagon 140 falls by gravity into the housing 158 of the conveyor and is then carried by the spiral blade 159 to the desired point of delivery. The spiral blade 159 is driven from the electric motor 32 through double V pulleys 40, belt 153, pulley 150 and cross-shaft 147 and extension 156 thereof.

It should be apparent that the above description and illustration of the present invention set forth the preferred embodiment thereof, and that various changes may be made in the construction and arrangement of the parts without departing from the spirit of the invention as defined in the appended claims.

Having thus described my invention, what I claim to be new and useful and desire to secure by Letters Patent of the United States is:

1. In a power transmission, a support, a motor mounted upon the support and including an armature shaft and a trip type switch operative to interrupt the operation of the motor, a load drive shaft mounted upon the support for rotation and spaced from the motor, speed reduction gearing operatively connecting the drive shaft and armature shaft, a guide pulley mounted upon the support and spaced from the motor, and a flexible element trained about the guide pulley and having one end connected with the motor switch and its opposite end connected with and entrained on the drive shaft whereby continued rotation of the drive shaft through the speed reduction gearing will cause the flexible element to be wound upon the drive shaft for automatically actuating the switch for the motor to interrupt the operation of the motor when the drive shaft has reached a predetermined number of revolutions.

2. In a power transmission, a support, a motor mounted upon the support and including an armature shaft and a switch operative to interrupt the operation of the motor, a load drive shaft rotatably mounted upon the support and spaced from the motor, an element rotatably mounted upon the drive shaft, speed reduction gearing connecting the armature shaft and element, a ratchet wheel mounted upon the drive shaft and spaced axially of the element and adapted to oscillate with respect to the drive shaft, mechanical means connecting the ratchet wheel and speed reduction gearing for causing the ratchet wheel to oscillate, an axially shiftable clutch device mounted upon the drive shaft between the ratchet wheel and element, mechanical means connected with the clutch device for shifting it alternately into engagement with the ratchet wheel and element so that the drive shaft may be driven in one direction with a relatively slow step by step movement and in the opposite direction with a relatively fast continuous movement, a guide pulley mounted upon the support and spaced from the motor, and a flexible element extending about the guide pulley and having one end connected with the switch of the motor and its opposite end entrained on the drive shaft to be wound thereon whereby the switch is operative to interrupt the operation of the motor when the drive shaft has reached a predetermined number of revolutions.

FLORIAN B. RECKER.

REFERENCES CITED

The following references are of record in the file of this patent:

UNITED STATES PATENTS

| Number | Name | Date |
|---|---|---|
| 793,626 | Darlington | June 27, 1905 |
| 928,024 | Buswell | July 13, 1909 |
| 1,354,645 | Hartsock | Oct. 5, 1920 |
| 1,717,843 | Hollnagel | June 18, 1929 |
| 1,923,995 | Nock | Aug. 22, 1933 |
| 2,005,122 | Young et al. | June 18, 1935 |
| 2,097,909 | Atz, Jr. | Nov. 2, 1937 |
| 2,340,983 | Pfeiffer et al. | Feb. 8, 1944 |
| 2,355,226 | Mallory | Aug. 8, 1944 |